United States Patent
Berliant

(10) Patent No.: US 7,975,811 B2
(45) Date of Patent: Jul. 12, 2011

(54) CONSTANT FORCE RAIL CLAMP

(75) Inventor: Igor Berliant, Surrey (CA)

(73) Assignee: Hillmar Industries Ltd., Delta (CA)

( * ) Notice: Subject to any disclaimer, the term of this patent is extended or adjusted under 35 U.S.C. 154(b) by 738 days.

(21) Appl. No.: 12/018,085

(22) Filed: Jan. 22, 2008

(65) Prior Publication Data

US 2009/0183956 A1  Jul. 23, 2009

(51) Int. Cl.
*B61H 7/12* (2006.01)

(52) U.S. Cl. .............................. 188/43; 188/41

(58) Field of Classification Search .................. 188/43, 188/41, 44, 45, 265, 33
See application file for complete search history.

(56) References Cited

U.S. PATENT DOCUMENTS

| | | | |
|---|---|---|---|
| 720,005 A | 2/1903 | Dashler | |
| 1,974,114 A | 8/1934 | McCormick | |
| 2,172,627 A * | 9/1939 | Snow, Jr. | 188/43 |
| 3,017,958 A * | 1/1962 | Richter | 188/43 |
| 3,972,392 A | 8/1976 | Johnson | |
| 3,986,584 A | 10/1976 | Wright et al. | |
| 4,169,522 A | 10/1979 | Highland | |
| 4,234,059 A * | 11/1980 | Schaad | 188/43 |
| 4,236,608 A | 12/1980 | Kobelt | |
| 4,308,937 A | 1/1982 | Johnson | |
| 4,377,220 A | 3/1983 | Briggs | |
| 5,261,509 A | 11/1993 | Cattini | |
| 5,353,895 A | 10/1994 | Camack et al. | |
| 5,363,942 A | 11/1994 | Osada | |
| 6,802,402 B2 | 10/2004 | Bausch et al. | |

FOREIGN PATENT DOCUMENTS

| | | |
|---|---|---|
| FR | 2530211 | 1/1984 |
| GB | 2151730 | 7/1985 |

* cited by examiner

*Primary Examiner* — Melanie Torres Williams
(74) *Attorney, Agent, or Firm* — Cameron IP

(57) ABSTRACT

A rail clamp comprises a frame and a pair of levers. Each of the levers has a brake pad at a first end thereof, a cam follower at second end thereof, and is mounted to the frame by a pivot disposed between said first and second ends. A cam is disposed between the levers and a spring biases the cam in a first direction. A clamp release actuator is operable to displace the cam in a second direction. The second direction is opposite to the first direction. A pair of variably sloped cam surfaces are disposed on opposite sides of the cam. Each of the variably sloped cam surfaces is in contact with the cam follower of a corresponding one of the levers, and each of the variably sloped cam surfaces has a slope which varies to counteract variations in a spring force of the spring as the cam is displaced, thereby maintaining a constant clamping force.

15 Claims, 8 Drawing Sheets

CONSTANT FORCE RAIL CLAMP

BACKGROUND OF THE INVENTION

1. Field of the Invention

The present invention relates to rail clamps and, in particular, to spring actuated, hydraulically released, brakes for cranes and other material handling equipment.

2. Description of the Related Art

Rail clamps are well known. U.S. Pat. No. 3,972,392 issued Aug. 3, 1976 to Norman Allen Johnson, discloses a fail-safe rail clamping apparatus which is adapted to grip the sides of a crane rail. A pair of clamp levers are provided with brake shoes, at first ends thereof, to allow for clamping engagement with opposite sides of the rail. Second ends of the clamp levers are pivotally connected to actuating links to form a toggle mechanism. A compression spring acts on the toggle mechanism to pivot the clamp levers so as to urge the first ends of the clamp levers into engagement with the rail. However, the mechanism ratio of the clamp levers and the toggle mechanism changes faster than the spring force. Accordingly, for narrow rails or for worn brake shoes, the clamping force be very high even for a very small toggle angle.

It is also known to use a wedge to pivot a pair of clamp levers in order to effect braking. U.S. Pat. No. 5,353,895 issued Oct. 11, 1994 to Dermot E. Camack et al., discloses a spring actuated, hydraulically released, emergency braking system for hoist cages. The braking system comprises a pair of brake arms with opposed brake shoes at first ends thereof, and cam followers at second ends thereof. Hydraulic pressure, normally applied to a cylinder, maintains a piston rod in an extended position with the cam followers riding on a cam and the brake shoes clear of the braking surfaces. Upon release of the hydraulic pressure, the piston rod is retracted by a spring force. This causes the cam followers to travel up the cam surfaces and the brake levers to pivot into engagement with the braking surfaces. However, once the brake application commences and the spring force decreases, the cam followers continue to travel along the cam surfaces. Accordingly, the braking force decreases due to decreased spring force resulting from extension of the spring.

BRIEF SUMMARY OF THE INVENTION

It is an object of the present invention to provide a novel and improved spring actuated braking mechanism which, at least partly, compensates for spring force variations as an actuating spring extends and contracts.

There is provided a spring actuated, hydraulically released brake in the form of a rail clamp comprising a frame and a pair of levers. Each of the levers has a brake pad at a first end thereof, a cam follower at second end thereof, and is mounted to the frame by a pivot disposed between said first and second ends. A cam is disposed between the levers and a spring biases the cam in a first direction. A clamp release actuator is operable to displace the cam in a second direction. The second direction is opposite to the first direction. A pair of variably sloped cam surfaces are disposed on opposite sides of the cam. Each of the variably sloped cam surfaces is in contact with the cam follower of a corresponding one of the levers, and each of the variably sloped cam surfaces has a slope which varies to counteract variations in a spring force of the spring as the cam is displaced, thereby maintaining a constant clamping force.

DESCRIPTION OF THE PREFERRED EMBODIMENT

Figure 1:
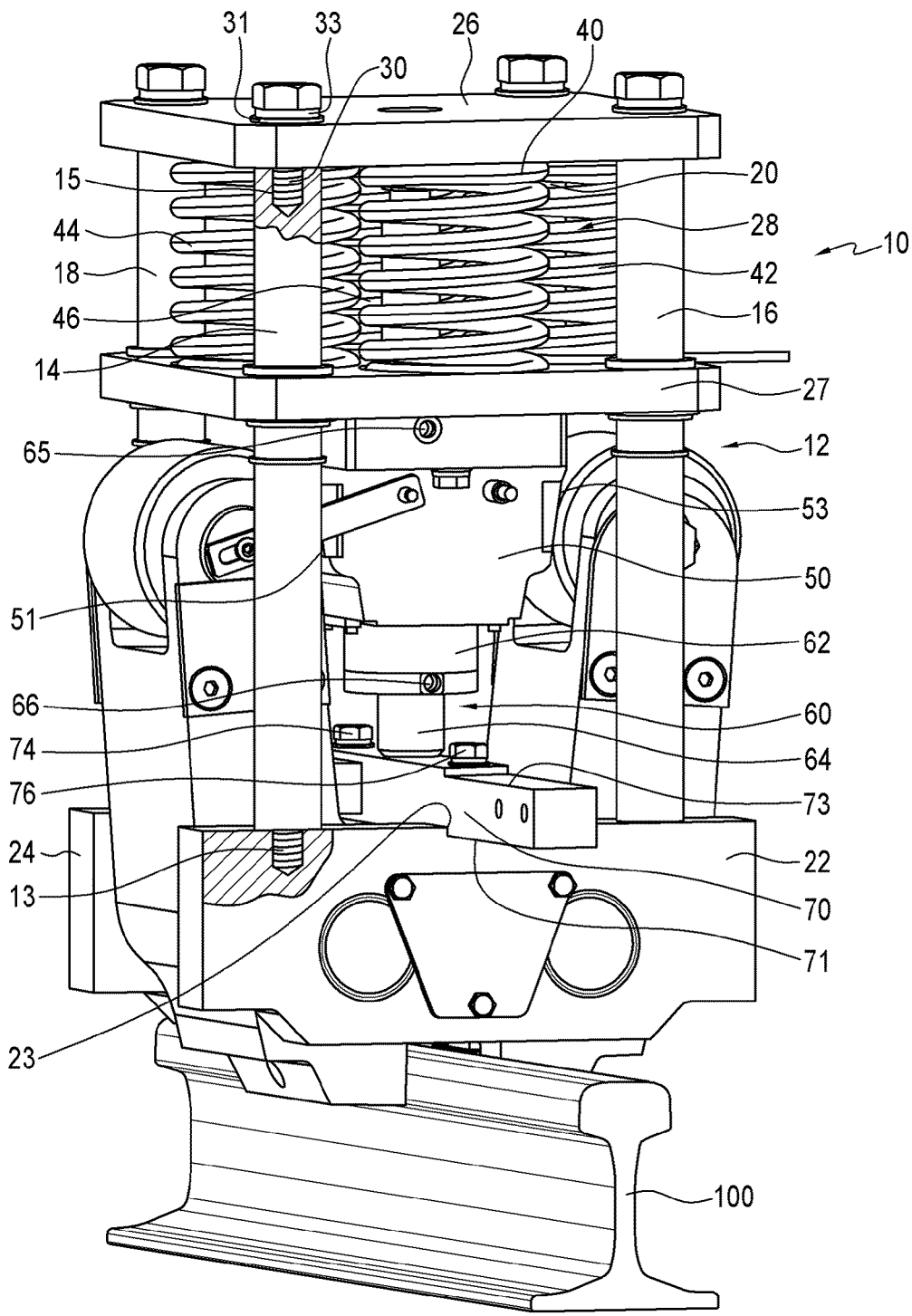
FIG. 1 is a perspective, partially in section, view of a constant force rail clamp.

Referring to the drawings, and first to FIG. 1, this shows a spring actuated, hydraulically released, braking mechanism in the form of a constant force rail clamp 10. The rail clamp 10 is a novel wedge-style clamp, which maintains a constant breaking or clamping force between a rail and opposed clamping levers despite differences in the spring force being applied. The rail clamp 10 has a frame 12 which, in this example, includes four spaced-apart guide posts 14, 16, 18 and 20. The guide posts 14, 16, 18 and 20 connect a pair of mounting plates 22 and 24 to a spring mechanism 28. A first pair of the guide posts 14 and 16 connect a first one of the mounting plates 22 to a top plate 26 of the spring mechanism 28. A second pair of the guide posts 18 and 20 connect a second one of the mounting plates 24 to the top plate 26 of the spring mechanism 28. As shown for one of the guide posts 14, each guide post has a threaded first end 13 which is in threaded engagement with a corresponding one of the mounting plates 22. Each of the guide posts also has a threaded bore 15 at a second end thereof. This allows for threaded engagement with a bolt 30 which, with a pair of washers 31 and 33, secures the guide post 14 to the top plate 26 of the spring mechanism 28.

A bottom plate 27 of the spring mechanism 28 is substantially rectangular and has a bore (not shown) near each corner thereof. The guide posts 14, 16, 18 and 20 each slidingly extend through a corresponding one of the bores so that the bottom plate 27 of the spring mechanism 28 is slidable along the guide posts 14, 16, 18 and 20. The spring mechanism 28 also includes helical compression spring 40, 42, 44 and 46. The compression springs 40, 42, 44 and 46 extend longitudinally between the top plate 26 and the bottom plate 27 of the spring mechanism 28. In this example, there are four compression springs. However, it will be understood by a person skilled in the art that any suitable number or type of springs may be used.

Figure 4:
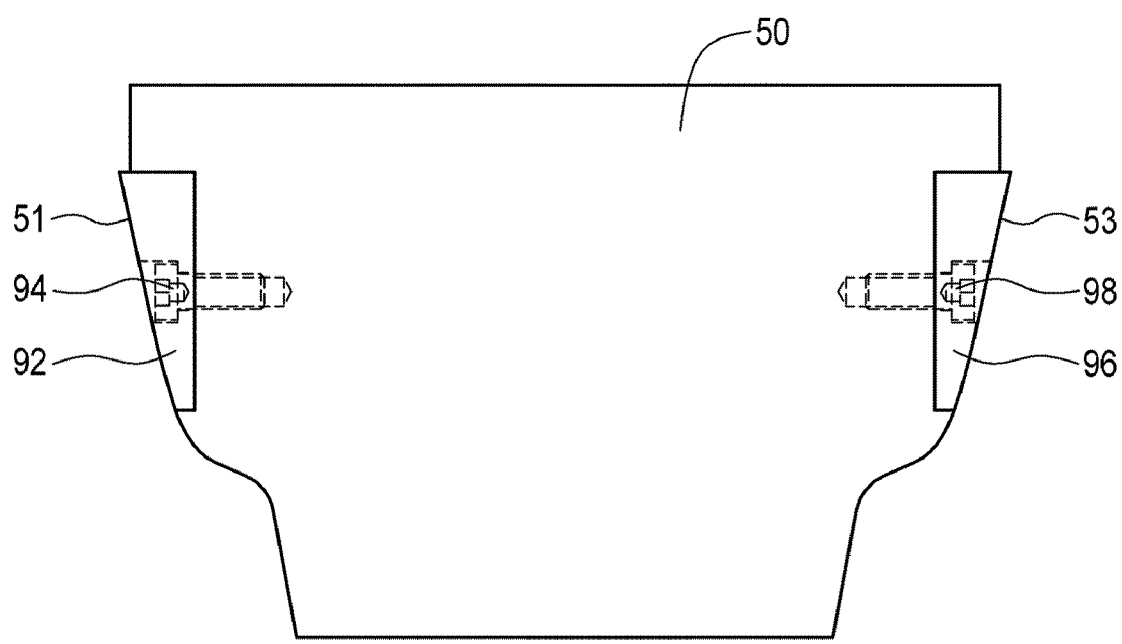
FIG. 4 is a side elevation view of a variably sloped cam wedge of the constant force rail clamp of FIG. 1.

A crossbar 70 extends between the mounting plates 22 and 24. A bottom side 71 of the crossbar 70 is received by recesses in the tops of the mounting plates 22 and 24. In FIG. 1, only a recess 23 in one of the mounting plates 22 is shown. Bolts 74 and 76 fasten the crossbar 70 to the mounting plates 22 and 24. A clamp actuator 60 is disposed between the crossbar 70 and the spring mechanism 28. The clamp actuator 60 comprises a variably sloped cam, in the form of a wedge 50, a cylinder 62 on which the wedge 50 is mounted, and a piston rod 64 which is mounted on the crossbar 70. Ports 65 and 66 and fluid conduits (not shown) connected to the ports 65 and 66 allow pressurized fluid to flow to and from the cylinder 62. The wedge 50 is operatively connected to the bottom plate 27 of the spring mechanism 28. As best shown in FIG. 4, variably sloped wedge surfaces 51 and 53 are disposed on opposite sides of the wedge 50. Preferably, the variably sloped wedge surfaces 51 and 53 are formed, at least in part, by profiled inserts 92 and 96 respectively. The inserts 92 and 96 are fastened to the wedge 50 by bolts 94 and 98 respectively. Accordingly, the inserts 92 and 96 are replaceable allowing for easy maintenance should they become damaged or worn.

Figure 2:
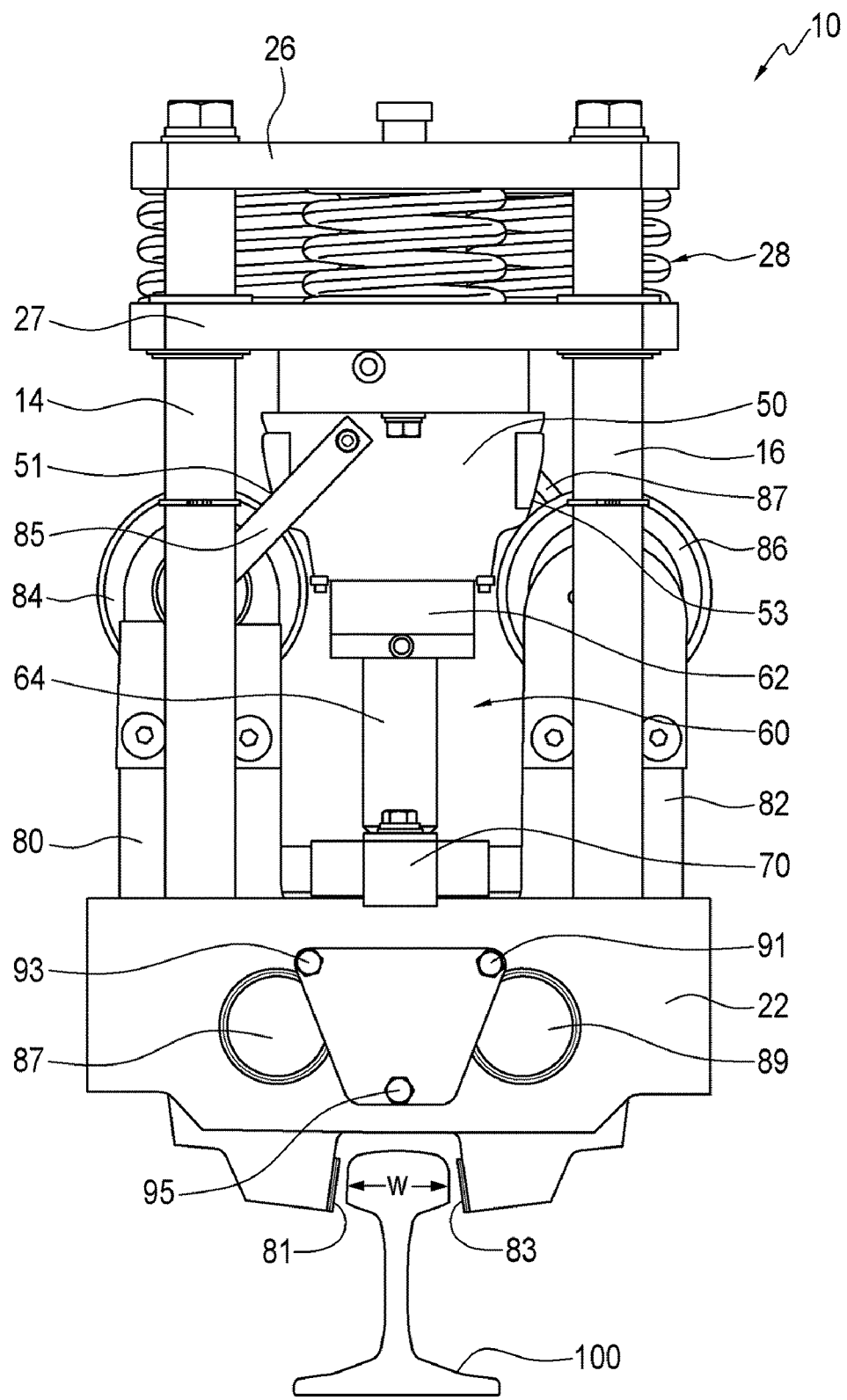
FIG. 2 is a side elevation view showing the constant force rail clamp of FIG. 1 in a released position.

As best shown in FIG. 2, the rail clamp 10 further includes pair of opposed clamping levers 80 and 82. Each of the levers 80 and 82 has a brake or friction pad 81 and 83, respectively, on a first end thereof. Each of the levers 80 and 82 also has cam follower, in the form of a roller 84 and 86, respectively, on a bifurcated second end thereof. The levers 80 and 82 are each pivotally connected to the mounting plates 22 and 24, both of which are shown in FIG. 1, by pivot pins 87 and 89 respectively. The pivot pins 87 and 89 are disposed between the pads 81 and 83 and the rollers 84 and 86. The pivot pins 87 and 89 serve as pivots or fulcrums for the levers 80 and 82. The pivot pins 87 and 89 are retained in the mounting plates 22 and 24 by retainer plates. In FIG. 2, only a retainer plate 90 for one of the mounting plates 22 is shown. The retainer plate 90 is secured to the mounting plate 22 by screws 91, 93 and 95. Linking bars 85 and 87 connect the levers 80 and 82, respectively, to the wedge 50.

FIG. 2 shows the rail clamp 10 in a released position. In the released position hydraulic pressure from the cylinder 62 of the clamp actuator 60 urges the bottom plate 27 of the spring mechanism 28 away from a rail 100 upon which a crane (not shown) or other material handling equipment moves. The springs 40, 42, 44 and 46 in the spring mechanism 28 are compressed and the wedge 50 is in a furthest position from the rail 100. The linking bars 85 and 87 retain the rollers 84 and 86 in communication with the wedge surfaces 51 and 53 while still ensuring proper clearance between the rail 100 and the brake pads 81 and 83. Accordingly, the wedge 50 remains extended between the rollers 84 and 86, with the wedge surfaces 51 and 53 in wedging contact with the rollers 84 and 86. In the released position, the rollers 84 and 86 are in contact with portions of the wedge surfaces 51 and 53 which generally have steeper slope than the reminder of the wedge 50.

Figure 3:
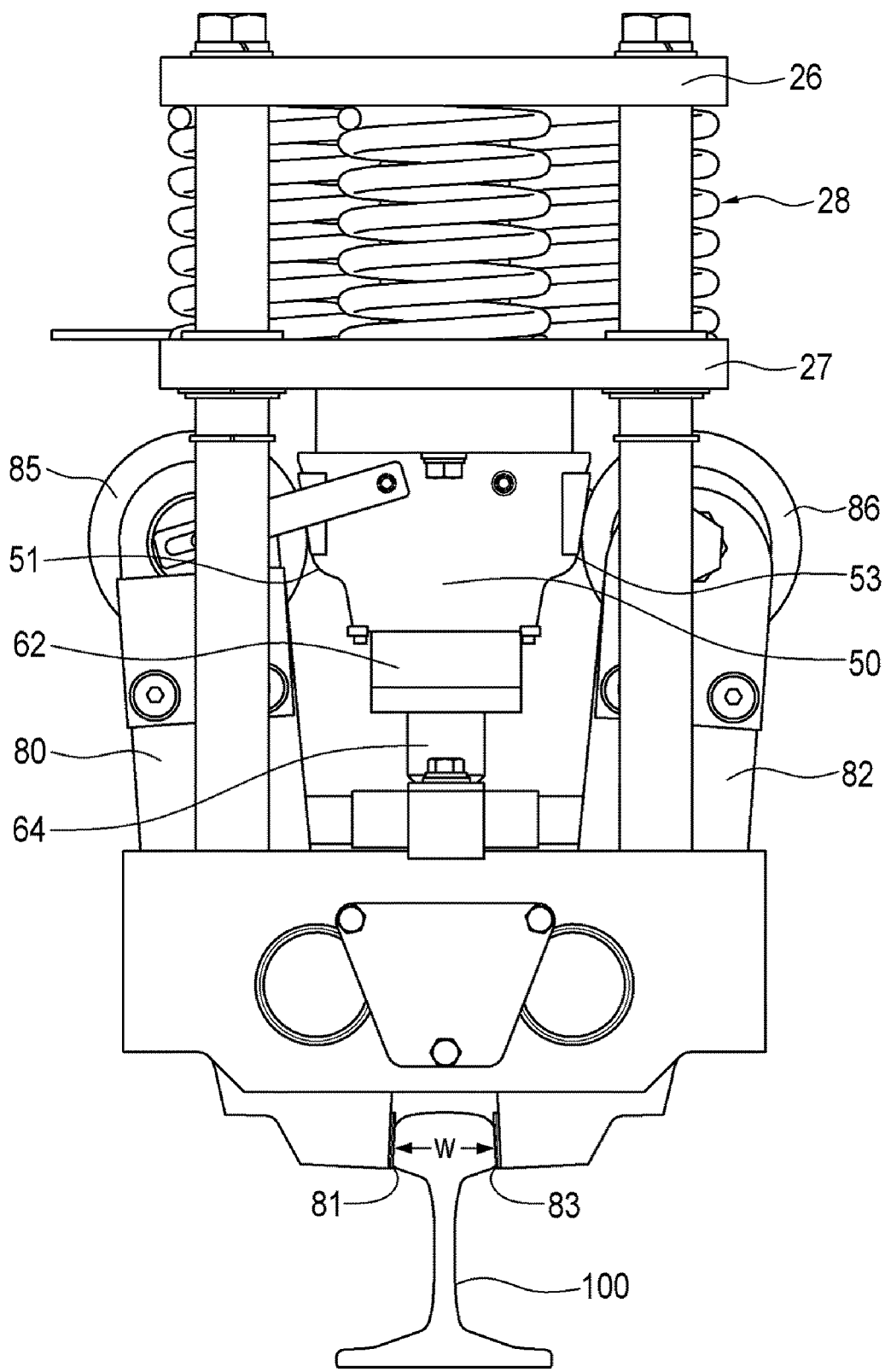
FIG. 3 is a side elevation view showing the constant force rail clamp of FIG. 1 in an engaged position.

In order to engage the rail 100, hydraulic pressure is released from the cylinder 62 of the clamp actuator 60. This causes the springs 40, 42, 44 and 46 in the spring mechanism 28 extend and urge the bottom plate 27 of the spring mechanism 28 towards the rail 100. The bottom plate 27 of the spring mechanism 28 is operatively connected to the wedge 50 and is in slidable engagement with the guide posts 14, 16, 18 and 20. Accordingly, the guide posts 14, 16, 18 and 20 guide the movement of the bottom plate 27 and the wedge 50 towards to the rail 100. As the wedge 50 moves towards the rail 100, the rollers 84 and 86 roll along the wedge surfaces 51 and 53 of the wedge 50 and are wedged apart from one another. This causes the levers 80 and 82 to pivot about the pivot pins 87 and 89 and urges the pads 81 and 83 against the rail 100 thereby moving the rail clamp 10 to an engaged position which is shown in FIG. 3. To release the rail clamp 10 from the engaged position, hydraulic fluid is supplied to the cylinder 62 of the clamp actuator 60, causing the piston rod 64 to extend and the wedge 50 to move away from the rail 100 back to the position shown in FIG. 2.

The wedge 50 and the levers 80 and 82 provide a mechanism ratio for clamping, which when multiplied by the spring force of the springs 40, 42, 44 and 46 acting on the bottom plate 27 of the spring chamber 28, provides a clamping force which urges the pads 81 and 83 against opposite sides of the rail 100. As the springs 40, 42, 44 and 46 relax downwardly, the spring force of the springs 40, 42, 44 and 46 varies. Accordingly, if the mechanism ratio does not change the resulting clamping force will vary. In the rail clamp 10 disclosed herein, the mechanism ratio changes when the rollers 84 and 86 roll along the variably sloped wedge surfaces 51 and 53 of the wedge 50. By appropriately varying the slopes of the wedge surfaces 51 and 53, the mechanism ratio changes to counteract changes in the spring force which results from spring extension and compression. The appropriate variations to the slopes of the wedge surfaces 51 and 53 are determined by the calculations shown in Appendix A attached hereto.

Figure 5:
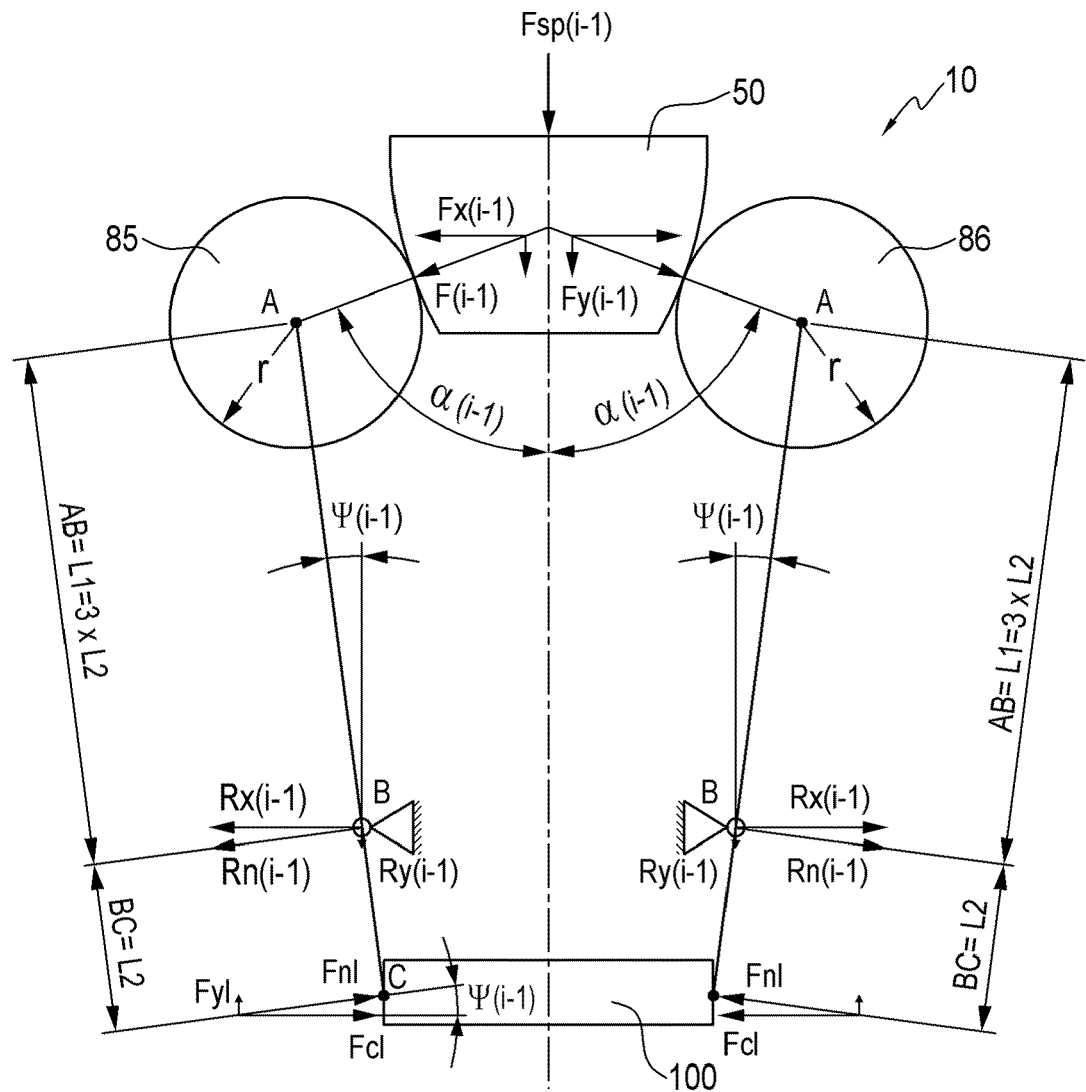
FIG. 5 is a force diagram showing the variably sloped cam wedge of the constant force rail clamp of FIG. 1 at a first position.
Figure 6:
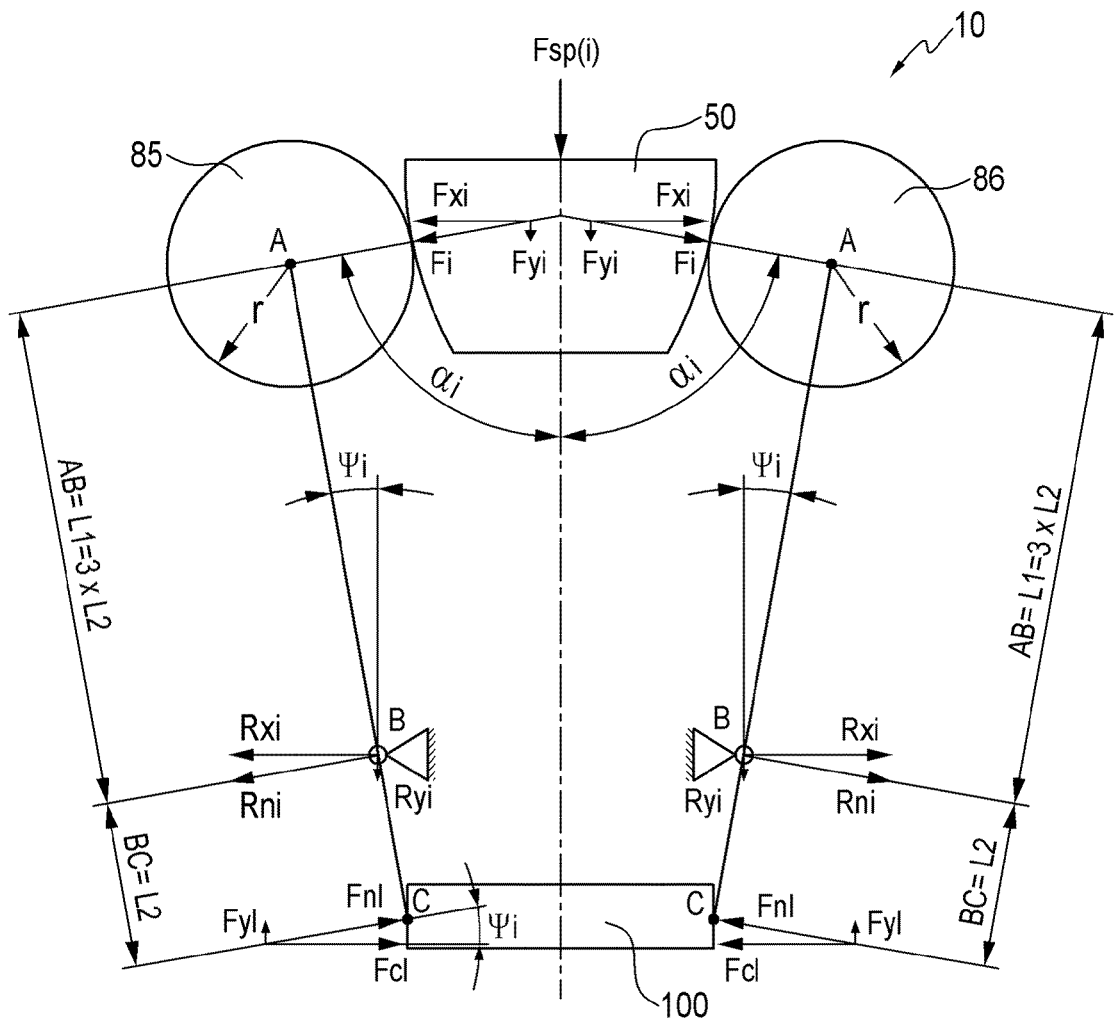
FIG. 6 is a force diagram showing the variably sloped cam wedge of the constant force rail clamp of FIG. 1 at a second position.

Referring now to FIGS. 5 and 6, these show force diagrams of the rail clamp 10 with the wedge 50 at different positions. FIG. 5 shows the wedge at position (i-1) and FIG. 6 shows the wedge at position (i). In FIGS. 5 and 6 the lever model is simplified and is considered as a lever with a first end C, a pivot B, and a second end A. Force is applied to the second end A of the lever and the first end C is for contacting the rail 100. The lever arm ratio is 3:1, i.e. AB=3×BC. Deflection of the lever and related parts are not considered. For the whole rail clamp 10 the force is applied to the top of the wedge 50. The distance between the pivots B remains the same.

In FIGS. 5 and 6:

AB=L1 Lever long arm

BC=L2 Lever short arm r Roller radius

Figure 7:
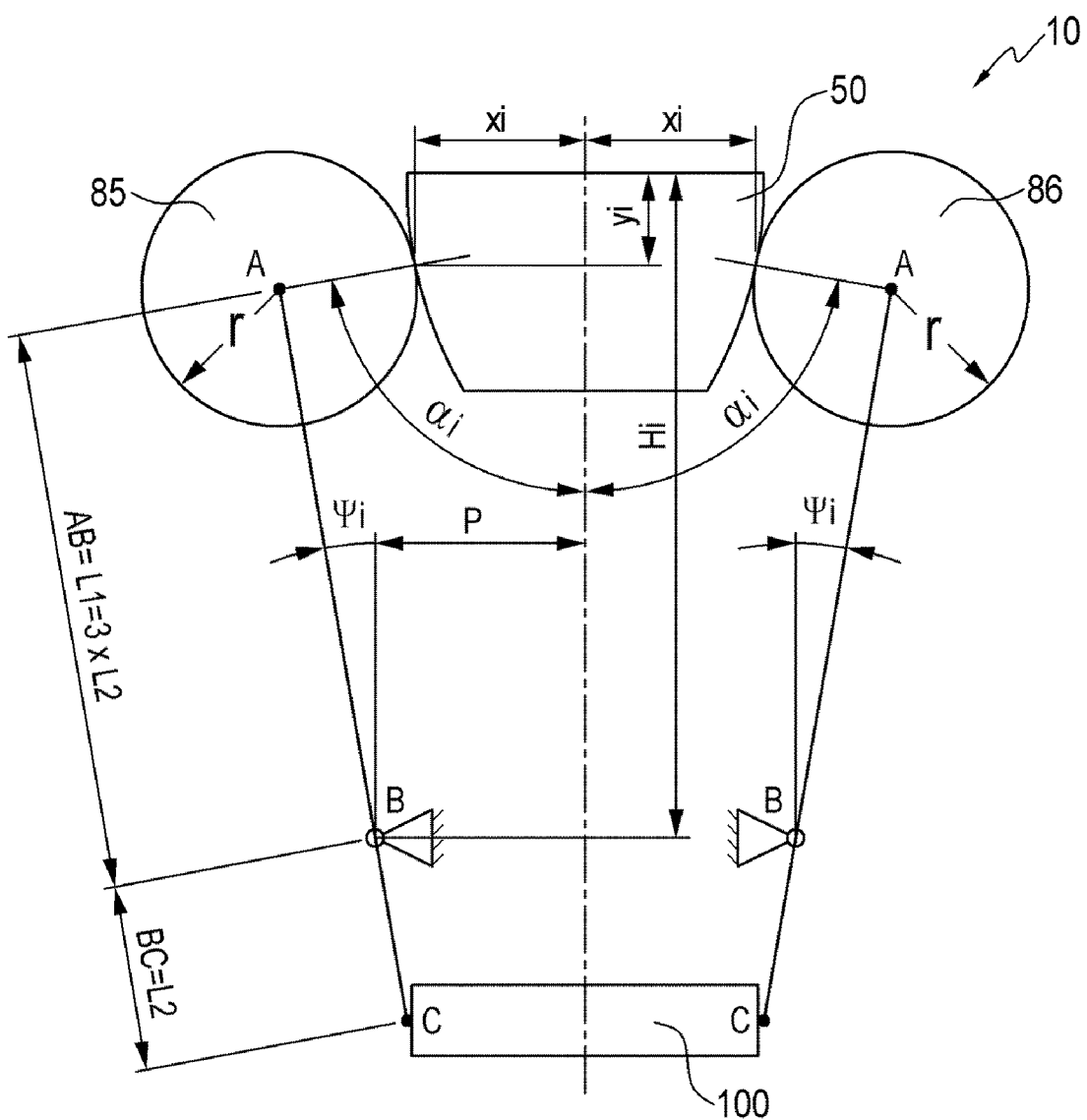
FIG. 7 is a diagram showing the respective geometry and distances which define the force diagram of FIG. 6.

P Distance between mechanism vertical axis and levers pivoting points $\alpha$ Angle between mechanism vertical axis and normal to the wedge line at contact point $\psi$ Angle between vertical axis and lever $F_{sp}$ Spring force $F_{cl}$ Lever clamping force $F_{ri}=F_{yi}=F_{sp}/2$ Spring force that applies on one lever $F_i=F_{yi}/\cos(\alpha_i)$ Force applied on the lever at contact point with the wedge X Parameter defining wedge profile at the lateral direction Y Parameter defining wedge profile at the vertical direction Referring now to FIG. 7 this shows the respective geometry and distances which define the force diagram of FIG. 6. The parameters defining the wedge geometry are angle $\alpha$, and the X and Y coordinates. A standard wedge profile, i.e. a straight wedge profile where angle $\alpha$, constant, provides a clamping force between a rail and opposed clamping levers that varies depending on the spring force applied. Please see Section 4 of attached Appendix A in this regard. In the rail clamp 10 disclosed herein, to keep the clamping force constant despite rail width and tolerance, as well as rail and brake pad wear, angle $\alpha$ is changed in relation to the spring force, respectively angle $\psi$. The equation defining the required clamping force is found in Appendix A. It determines angle $\alpha$ and the X and Y parameters at a required clamping force and different angles $\psi$. An iteration method is applied defining the required parameters. After five iterations, at different angles $\psi$ and respectively different spring forces for the required constant clamping force, the final results for the angle $\alpha$ and the X and Y parameters are determined. Section 7 of Appendix A shows the final results for all the parameters defining a wedge profile at a constant clamping force.

Figure 8:
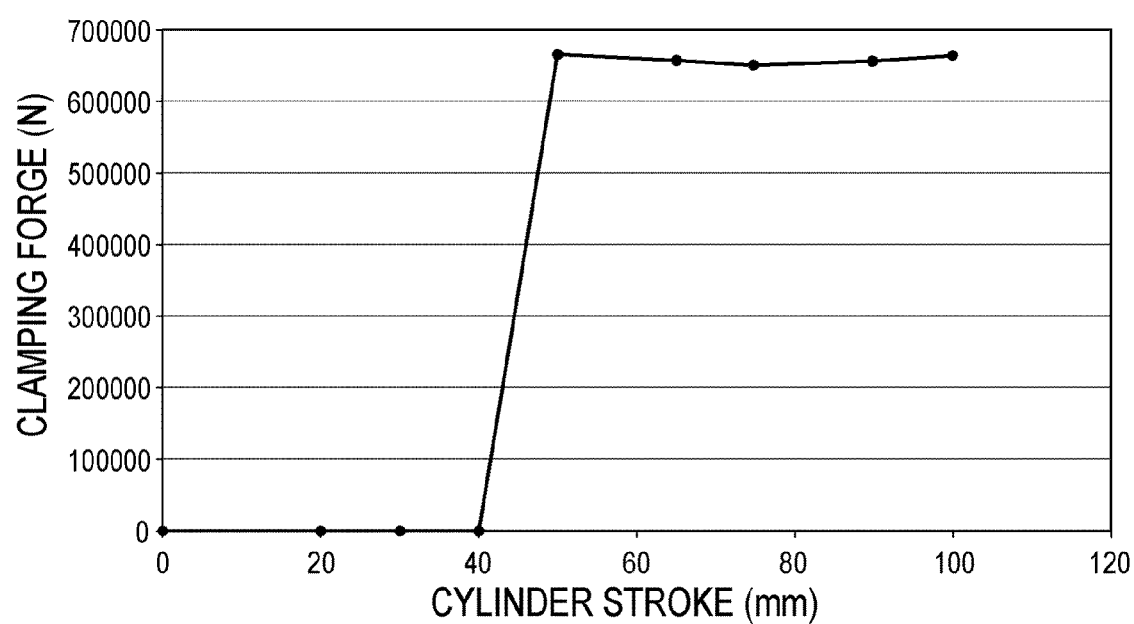
FIG. 8 is a graphically representation showing a constant clamping force of the constant force clamp of FIG. 1.

Accordingly, FIGS. 5, 6 and 7 together with Appendix A show how the clamping force is maintained substantially constant or within a predetermined range as shown graphically in FIG. 8.

Practically speaking and, with reference to FIG. 2, the narrower the width W of the portion of the rail 100 contacted by the brake pads 81 and 83, the greater extension of the springs 40, 42, 44 and 46 that is required for the brake pads 81 and 83 to clamp against opposite sides of the rail 100. Therefore, the narrower the width W, the less spring force is available for clamping. Varying wedge angles of the wedge surfaces 51 and 53 compensates for the decreased spring force as the springs 40, 42, 44 and 46 extend and accordingly provides an substantially constant braking force across a variety of rail widths. Furthermore, as the brake pads 81 and 83 wear down, greater extension of the springs 40, 42, 44 and 46 is also required for the pads 81 and 83 to exert the clamping force on the opposite sides of the rail 100. The varying slopes of the wedge surfaces 51 and 53 of the wedge 50 accordingly adjusts the mechanism ratio so that the clamping force is maintained substantially constant as the brake pads 81 and 83 wear down. This increases predictability for the operator of the conveyance on which the rail clamps 10 are used, thereby increasing safety.

It will be understood by a person skilled in the art that the application of a constantly applied force via a variable cam surface shall not be restricted to the braking mechanism as illustrated in the Figures. It is applicable to any spring actuated mechanism and, in particular, to mechanisms particularly sensitive to the loss of spring due to wear, for example, a spring actuated disc brake or clamp.

It will be further understood by someone skilled in the art that many of the details provided above are by way of example only and are not intended to limit the scope of the invention which is to be determined with reference to the following claims.

I claim:

1. A breaking mechanism comprising:
   a frame;
   a pair of levers, each of the levers having a brake pad at a first end thereof, a cam follower at second end thereof, and being mounted to the frame by a pivot disposed between said first and second ends;
   a cam disposed between the levers;
   a spring biasing the cam in a first direction;
   a clamp release actuator includes a hydraulic cylinder and piston, the clamp release actuator operable to displace the cam in a second direction, the second direction being opposite to the first direction; and
   a pair of variably sloped cam surfaces disposed on opposite sides of the cam, each of the variably sloped cam surfaces being in contact with the cam follower of a corresponding one of the levers, and each of the variably sloped cam surfaces having a slope which varies to counteract variations in a spring force of the spring as the cam is displaced, thereby maintaining a constant breaking force.

2. The braking mechanism as claimed in claim 1 wherein and the cam is mounted on the cylinder.

3. The braking mechanism as claimed in claim 1 wherein the cam is a wedge.

4. The braking mechanism as claimed in claim 1 wherein the cam follower of each of the levers is a roller rotatably mounted at the second end of said each of the levers.

5. The braking mechanism as claimed in claim 1 wherein the variably sloped cam surfaces each includes a replaceable insert.

6. A braking mechanism for clamping a rail, the rail clamp comprising:
   a frame;
   a lever, the lever having a brake pad at a first end thereof, a cam follower in the form of a roller rotatably mounted at second end thereof, and being mounted to the frame by a pivot disposed between said first and second ends;
   a cam;
   a spring biasing the cam in a first direction;
   a clamp release actuator operable to displace the cam in a second direction, the second direction being opposite to the first direction; and
   a variably sloped cam surface disposed on a side of the cam, the variably sloped cam surfaces being in contact with the cam follower, and the variably sloped cam surface having a slope which varies to counteract variations in a spring force of the spring as the cam is displaced thereby maintaining a constant braking force.

7. The braking mechanism as claimed in claim 6 wherein the clamp release actuator includes a hydraulic cylinder and piston, and the cam is mounted on the piston.

8. The braking mechanism as claimed in claim 7 wherein and the cam is mounted on the cylinder.

9. The braking mechanism as claimed in claim 6 wherein the cam is a wedge.

10. The braking mechanism as claimed in claim 6 wherein the variably sloped cam surface includes a replaceable insert.

11. A rail clamp for clamping a rail, the rail clamp comprising:
    a frame;
    a pair of levers, each of the levers having a brake pad at a first end thereof, a cam follower at second end thereof, and being mounted to the frame by a pivot disposed between said first and second ends;
    a cam disposed between the levers;
    a spring biasing the cam in a first direction;
    a clamp release actuator operable to displace the cam in a second direction, the second direction being opposite to the first direction; and
    a pair of variably sloped cam surfaces disposed on opposite sides of the cam, each of the variably sloped cam surfaces being in contact with the cam follower of a corresponding one of the levers, and each of the variably sloped cam surfaces having a replaceble insert with a slope which varies to counteract variations in a spring force of the spring as the cam is displaced, thereby maintaining a constant clamping force.

12. The rail clamp as claimed in claim 11 wherein the clamp release actuator includes a hydraulic cylinder and piston.

13. The rail clamp as claimed in claim 12 wherein and the cam is mounted on the cylinder.

14. The rail clamp as claimed in claim 11 wherein the cam is a wedge.

15. The rail clamp as claimed in claim 11 wherein the cam follower of each of the levers is a roller rotatably mounted at the second end of said each of the levers.

* * * * *